INVENTOR
JEAN MAURICE
By Irwin S. Thompson
ATTY.

3,064,774
CIRCUIT FEEDING AN ELECTRO-
MAGNETIC CLUTCH
Jean Maurice, Paris, France, assignor to Societe Anonyme Francaise du Ferodo, Paris, France, a corporation of France
Filed Apr. 11, 1960, Ser. No. 21,175
Claims priority, application France Apr. 16, 1959
4 Claims. (Cl. 192—.052)

My invention has for its object a circuit feeding an electromagnetic clutch, more particularly intended for automobile vehicles and including an engine driving, through the agency of a clutch, a change speed transmission and associated with an accelerator pedal, a change speed lever and a dynamo adapted to be loaded by a battery, said circuit being of the type fed by a main supply adapted to produce, across the terminals of the clutch winding, a voltage which rises together with the speed of rotation of the driving shaft, while the torque which may be transmitted by the clutch is, in its turn, larger when the voltage arising across said terminals is higher and means are furthermore provided for switching off the feed of the clutch winding during the speed-changing operation.

In the electromagnetic clutches proposed hitherto, the actual dynamo of the vehicle is generally used as a supply for the clutch circuit. Such an arrangement often provides good results, in particular in the case of the different circuits feeding the clutches sold under the registered trade name "Ferlec" by the Société Anonyme Française du Ferodo, which circuits incorporate means associated with the dynamo, so as to ensure a perfectly gradual action of the clutch, without this detrimentally affecting the operation of the dynamo when loading the battery.

Such prior arrangements are however of actual interest only when the operative running conditions for which the dynamo is allowed to load the battery are substantially larger than the idling speed of the engine. Now, according to the present trend in the production of automobiles, said running conditions are selected comparatively near the idling speed.

My invention has for its object a circuit of the type considered for feeding an electromagnetic clutch, more particularly on board automobiles, which circuit is consistent with any selection of the minimum operative running conditions of the dynamo for the loading of the battery, said circuit allowing the reliable use of any type of friction linings for the clutch, even those linings, the frictional coefficient of which is highly variable with temperature, the operation of the circuit as a whole being satisfactory under all circumstances.

According to one of the main objects of my invention, the supply for the clutch-energizing circuit is constituted by a generator which is at least electrically independent of the automobile dynamo and is driven in the same manner as the latter at a speed proportional to the rotary speed of the engine, while the field of the generator is designed in a manner such that the increase in voltage with reference to the rotary speed may follow a parabolic curve and the increase of said voltage with the speed of rotation is limited by regulating means adjusted in a manner such that the torque which may be transmitted by the clutch for the regulated voltage may be larger than the maximum driving torque when the frictional coefficient of the lining reaches its minimum value. With linings showing excellent properties as far as gradual operation and wear are concerned, said torque may reach and rise slightly above three times the maximum driving torque. Through this arrangement, the clutch is suitably fed, whatever may be the adjustment provided for the connection of the automobile dynamo with the battery. Furthermore, any friction lining proposed for clutches may be used reliably, including those the frictional coefficient of which decreases substantially with temperature.

According to further features of my invention, the rotary speed of the engine above which the voltage regulation of the generator operates is selected within a range extending between twice and four times the idling speed of the engine and it approximates preferably three times said idling speed when the change speed gear provides a lower speed ratio such as the first speed or reverse, said proportion being substantially reduced down to about two thirds thereof for instance, when the change speed gear provides a larger ratio, such as the second or third speed. The nominal power of the generator is selected within the range extending between 110 and 130% of the nominal power of the clutch fed with the regulated voltage.

Preferably, the field of the generator is fed through the armature thereof, in association with a permanent magnet or with current fed from the battery. In the case of a compound field fed through the armature of the generator and through the battery, said field may be constituted by a single winding or by two separate field windings fed respectively by the armature and by the battery.

According to a still further feature of my invention the apparent resistance of the generator constituted by its ohmic resistance and its armature reaction should approximate the ohmic resistance of the clutch and range, for instance, between 80 and 120% of the latter, whereby the curve of voltage with reference to speed of the generator may be very different according as to whether the generator runs idle or is subjected to the load of the clutch. This arrangement may serve for the production of a signal at the moment at which the clutch circuit is switched off, chiefly at the moment at which a change of speed is being executed. This signal produces advantageously a modification in the clutch circuit when the accelerator pedal is released, so as to transform the clutch into torque-limiting means which transmit the braking torque of the engine, while cutting out any skidding of the driving wheels of the vehicle, for instance after lowering the speed ratio towards slower speeds.

The following description, illustrating these and other features of my invention, together with its advantages, relates to various embodiments selected by way of example and illustrated in the accompanying drawings, wherein.

Figure 1:
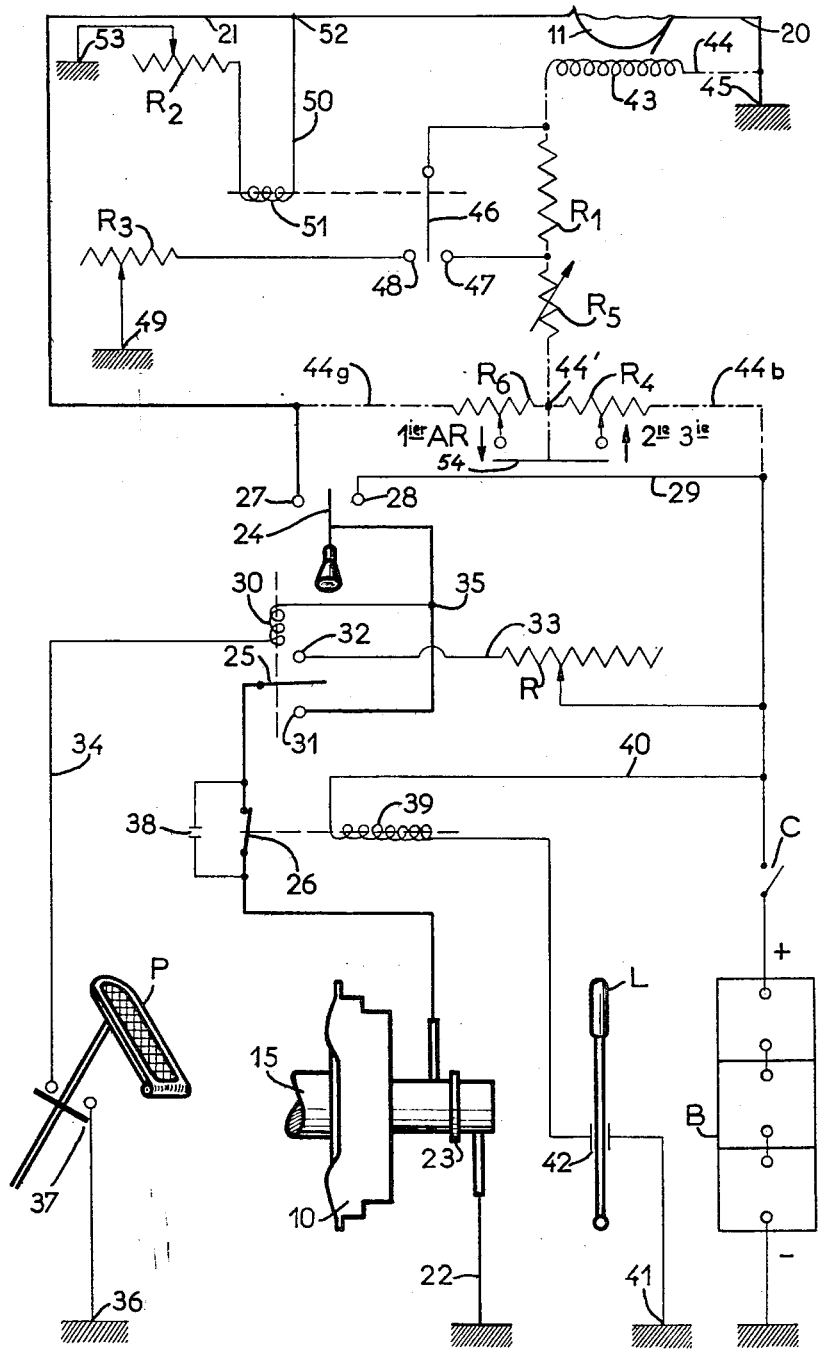
FIG. 1 illustrates diagrammatically the feed circuit of an electromagnetic clutch associated with an independent generator, the field winding of which is provided with a compound energization according to my invention.
Figure 2:
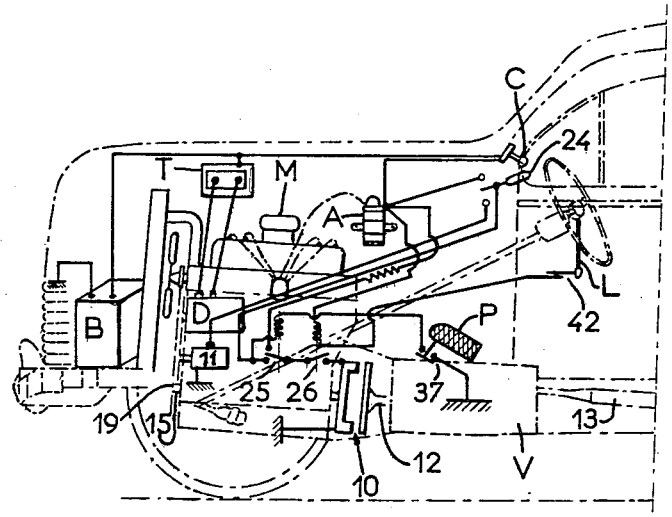
FIG. 2 is a diagrammatic view of the mounting of said circuit on an automobile.

I will first turn to FIGS. 1 and 2 relating to an application of my invention to an electromagnetic clutch 10 for an automobile, of the general type, wherein the torque transmitted by the clutch rises together with the voltage appearing across the terminals of the clutch winding.

According to my invention, the clutch 10 is fed chiefly by a generator 11 which is independent of the conventional dynamo D of the vehicle. It is apparent that said last-mentioned dynamo D of the vehicle has for its main purpose the reloading of the battery B, through the agency of a circuit-making and breaking device providing voltage regulation, as shown at T (FIG. 2). In FIG. 2, there is shown, in addition to the clutch 10, of which the driving part is driven by the crankshaft 15 in the engine M of the vehicle, while its driven part drives the main shaft 12 of the change speed box V. Said change speed box has its speed ratio selected by the change speed lever L and its output shaft 13 drives the driving wheels of the vehicle. P designates furthermore the accelerator pedal, C the general ignition switch and A the ignition coil.

Figure 3:
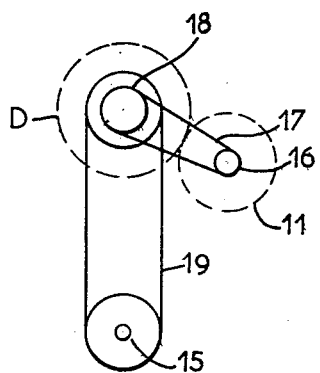
FIGS. 3 to 5 are highly diagrammatic showings of various driving means which may be used for the independent generator.
Figure 4:
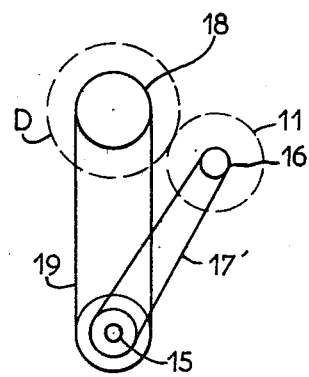
Figure 5:
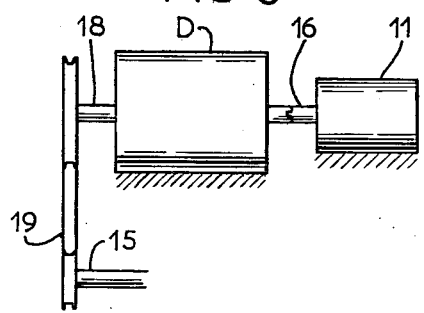

The independent generator 11, which is intended more particularly for feeding the electromagnetic clutch 10, is driven into rotation at a speed which is advantageously proportional to the speed of rotation of the crankshaft 15 of the engine M of the automobile. To this end, the shaft 16 of the generator 11 is driven (FIGS. 2 and 3) through a belt 17 by the shaft 18 of the conventional dynamo D which is, in its turn, driven by the crankshaft 15 by means of a belt 19. The angular speed of the shaft 16 is preferably brought to a multiple of the angular speed of the shaft 15 or 18, for instance to a value twice or four times larger. Any other suitable means for driving into rotation the generator 11 falls also within the scope of my invention as defined in the accompanying claims and it may include, for instance, as illustrated in FIG. 4, a belt 17' connecting directly the shaft 16 of the generator 11 with the crankshaft 15, or else, I may resort, as shown in FIG. 5, to a coaxial arrangement of the shafts 16 and 18, the shaft 16 being coupled with the shaft 18. It is also possible to execute, while retaining the same casing and the same shaft 18, a double generator, of which the corresponding electric elements D and 11 are independent. This arrangement would be of particular interest in the case where the direct current dynamo of the vehicle is replaced by an alternator of a lesser bulk, chiefly in an axial direction.

The independent generator 11 is shaped and designed, together with its field and the feed circuit of the electromagnetic clutch winding, in a manner such that said clutch may operate, in particular, as follows:

It should be disconnected when the motor M is idling;

It should be engaged gradually when the speed of rotation of the engine increases, said engagement being first slow and then more rapid, so as to provide a generally parabolic curve defining the torque capable of being transmitted by the clutch with reference to the speed of rotation of the engine, with a view to obtaining excellent conditions of comfort without this requiring, as a counter-part, a protracted slip which would lead to an exaggerated coefficient of friction for the friction linings of the clutch;

A slower engagement under first speed or reverse conditions than under second speed, third and higher speed conditions in the change speed gear box V;

The benefit of the braking performed by the engine should be retained for all speeds of rotation of the engine down to idling speed, even if the driver releases completely the accelerator pedal P;

It should cut out any possible skidding of the driving wheels of the automobile after shifting the speed provided by the change speed gear box V down to a lower speed.

Referring more particularly to the circuitry according to FIG. 1, which forms an arrangement satisfying the above-disclosed conditions, one of the brushes of the generator is grounded by a lead 20, while its other brush is connected with a lead 21 which is connected in its turn through the slip ring 23 to one end of the clutch winding 10, the other end of which is grounded through a further lead 22. The line formed by the leads 20—21—22 forms the main line feeding the clutch 10 through the agency of the independent generator, said main line being drawn thick.

In the lead 21 are inserted in series three switches as illustrated at 24, 25 and 26. The switch 24 is intended for hand operation by the driver only under exceptional circumstances, for instance in the case of a failure of the generator 11, said switch 24 forming a reversing switch adapted to substitute a feed through the battery B for the feed through the generator 11. 27 designates the generator contact-piece and 28 the battery contact-piece which is connected by a lead 29 to the battery B.

The switch 25 is controlled by a relay, of which the energizing winding is shown at 30, the generating contact-piece being shown at 31 and another contact-piece at 32, for connection with the battery B through the lead 33 which includes an adjustable resistance R. The circuit for the energized winding 30 is connected at 35 with the lead 21 and it is grounded at 36 through the agency of a switch 37 and lead 34 which is controlled in its turn by the location of the accelerator pedal P. Said winding is thus energized when the driver releases his foot entirely off the accelerator pedal, while its circuit is open for a predetermined depression of said pedal P.

The switch 26, which is mounted in parallel with the anti-sparking condenser 38, is actuated by a relay, of which the energizing winding is shown at 39. The circuit 40 for the winding 39 is fed by the battery B and is grounded at 41 through the agency of a switch 42. The latter is controlled by the change speed lever and it is closed when the driver grasps the lever L to execute a change speed and it is open when the driver releases said lever L. It may be readily understood that the main feeding circuit 21—22 is constituted by a direct line including no regulating means such as a rheostat or the like.

The generator 11 is provided with a field winding 43 which may be constituted by a single winding, but of which the energization is dual. The circuit 44 of the field winding 43 is drawn in dot-and-dash lines and is grounded at 45. It includes two resistances in series R1 and R5 and it is subdivided beyond same at 44' into two branch circuits, of which one, 44b, is fed by the battery B through the resistance R4, while the other branch circuit, 44g, is fed by the generator 11 through the resistance R6.

The resistance R1, which forms part of the voltage-regulating means, is shunted by a switch 46. The latter, controlled by a relay 51, regulates the voltage through operation of its contact-piece 47 connected with the circuit 44, while the other contact-piece 48 is grounded at 49 through the agency of a preferably adjustable resistance R3 inserted shuntwise with the field winding 43. The circuit circuit 50 feeding the relay winding 51 acting on the switch 46 is connected at 52 with the lead 21 and is grounded at 53 through an adjustable resistance R2 adapted to adjust the regulated value of the voltage. The resistance R3, the value of which ranges advantageously between one tenth and one quarter of the resistance R1, allows obtaining an exceedingly gradual reengagement. Such a regulation may also be performed through the agency of a third brush of the generator located between the two main brushes thereof.

The resistance R5 forms a simple adjustable resistance which has to be readjusted from time to time, so as to make up for the action of the wear of the friction linings of the clutch 10 on the actual power of the clutch. It will be understood that the insertion of said resistance R5 in a field circuit 44 feeding a low intensity leads only to a very low consumption of current.

The resistances R4 and R6 may be shunted by a switch 54. The latter is sensitive to the position of the selected gears in the gear transmission gear box V. It is open when the gear transmission is in first speed or reverse, so that the resistances R4 and R6 are inserted in the circuit, while it is closed for the second, third and higher speeds, whereby the resistances R4 and R6 are cut out at least partly.

The characteristic properties of the generator 11 and of the clutch 10 are selected taking into account the properties of the automobile and of its engine, with a view to obtaining a reliable operation under all circumstances. The nominal power of the generator 11 is selected to this end within a range extending between 110 to 130% of the nominal power of the clutch 10 fed under regulated voltage conditions.

The value of the regulated voltage is defined by the selection of the resistance R2 which adjusts simultaneously the speed of rotation of the engine above which the voltage produced by the generator reaches said regulating value. Said resistance R2 defines, in fact, the moment at which the relay blade 46 is shifted off the contact-piece 47 onto the contact-piece 48. When said shifting is obtained, the resistance R1 is inserted in the circuit 44 of the field winding 43, while the resistance R3 is fed in parallel with the winding 43 which stops the rise in voltage with increasing speeds of rotation.

The speed of rotation of the engine for which the regulation is started ranges preferably between one and four times idling speed and it approximates advantageously three times the idling speed under first speed and reverse conditions for which the resistances R4 and R6 are operative, while it is reduced to about two thirds of the preceding value for second, third and higher speed conditions, i.e. when the resistances R4 and R6 are cut out.

The regulated voltage is such that the torque which may be transmitted by the clutch for such a voltage is considerably larger than the maximum driving torque and it is, for instance, of a magnitude of three times said maximum torque. Any friction lining may thus reliably be incorporated with the clutch, including those the frictional coefficient of which decreases considerably with the rise in temperature, while showing excellent properties in other directions. Said arrangement allows, in partacular, transmitting, through the clutch, a maximum driving torque, even when the frictional coefficient of the friction linings, which varies between a maximum value and a minimum value, reaches said minimum value and even when said minimum value is as low as one third of the maximum value.

Furthermore, the apparent resistance of the generator 11 constituted by the combination of its ohmic resistance and of its armature reaction is selected so as to approximate the ohmic resistance of the clutch 10, say within a range extending between 80 and 120% of said resistance. The characteristic properties of said generator 11 are thus widely different according as to whether the generator rotates under the load formed by the clutch or is idle. In particular, there is obtained in the circuit 20—21—22 a clear rise in voltage above the regulated value at the moment of a break in the circuit.

Such a break is obtained chiefly at the moment of the opening of the switch 26 controlled by the driver's operation of the change speed gear lever 42. The rise in voltage thus obtained is transmitted to the winding 30 when the switch 37 is closed, i.e. when the accelerator pedal P is completely released.

Now, the winding 30 is selected so as to be sensitive to a voltage above the regulated voltage, whereby the blade 25 is shifted off the contact-piece 31 onto the contact-piece 32. However, the winding 30 shows a considerable hysteresis, as provided, for instance, by a large gap when inoperative, so that the blade 25 is returned from the contact-piece 32 onto the contact-piece 31 only upon a substantial dropping of the voltage down to a value corresponding to a speed of the engine approximating idling.

The operation of the arrangement described is as follows: the automobile being at a standstill, the engine revolving idly, the generator 11 feeds too little current and cannot overcome the springs releasing the clutch 10 which is thus completely disengaged. The blade 25 remains on its contact-piece 31 even if the switch 37 is closed by reason of the reduced speed of the generator which is not capable of energizing the winding 30 to a sufficient extent. When the driver depresses the accelerator, the speed of the engine increases together with the voltage produced by the generator 11, which leads to an engagement of the clutch which is particularly gradual when the resistances R4 and R6 are inserted for first speed or reverse conditions. The clutch no longer slips before the voltage of the generator 11 reaches its regulated desired value. A starting at second speed on a downwardly directed slope is obtained under the same conditions, except for the fact that the resistances R4 and R6 are cut out, with a view to obtaining a more rapid engagement of the clutch. In all cases, the arrangement of the field circuit 44 associated with a compound feed through the battery branch circuit 44b and the generator branch circuit 44g ensures an increase according to a parabolic curve for the torque adapted to be transmitted with reference to the speed of the engine, which corresponds to comfort without any operation that is too slow.

At the moment of a change of speed operated by the lever L, the switch 42 is closed and the circuit 26 opens. A sudden modification in the voltage of the circuit is thus produced and energizes the relay 30, so as to bring the blade 25 into engagement with the contact-piece 32 when the switch 37 is closed by reason of the release of the pedal P, which is the case, in particular, when the driver lowers the speed in the change speed gear box V, so as to slow down the automobile. After the change in speed and upon consequent closing of the switch 26, the clutch is fed by the battery B through the resistance R as long as the pedal P remains in its lifted condition. It will be remarked that the resistance R prevents any too sudden engagement of the clutch. Said resistance is furthermore selected in a manner such that the torque adapted to be transmitted by the clutch may be slightly larger than the braking power of the engine; in other words, it should approximate one third of the maximum driving torque. Thus, the clutch acts, on the one hand, as a torque-limiting device which prevents any skidding of the driving wheels of the automobile, while it allows, on the other hand, benefiting fully by the braking action of the engine down to rotary speeds of the engine very near idling speed, as allowed by the hysteresis of the winding 30, as already mentioned.

As soon as the driver wishes to raise the speed and accelerates, the switch 37 opens, whereby the blade 25 returns into engagement with the contact-piece 31 and restores, without any shock, the normal feed of the clutch by the generator.

In the modifications illustrated in FIGS. 6 and 7, the arrangement is similar to that which has been described with reference to FIGS. 1 to 5, except for the fact that the field winding 43 is fed solely by the generator shunt arm 44g of the circuit, while the shunt branch fed by the battery at 44b has been eliminated.

Figure 6:
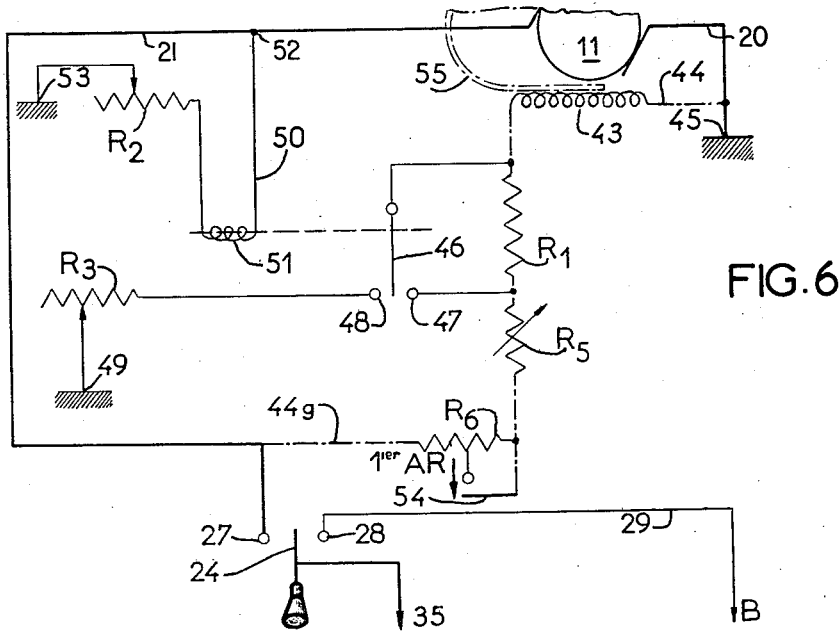
FIG. 6 is a view similar to a portion of the wiring diagram of FIG. 1, with the difference, however, that the field winding of the generator is energized solely shuntwise and is associated with a further field component constituted by a permanent magnet.
Figure 7:
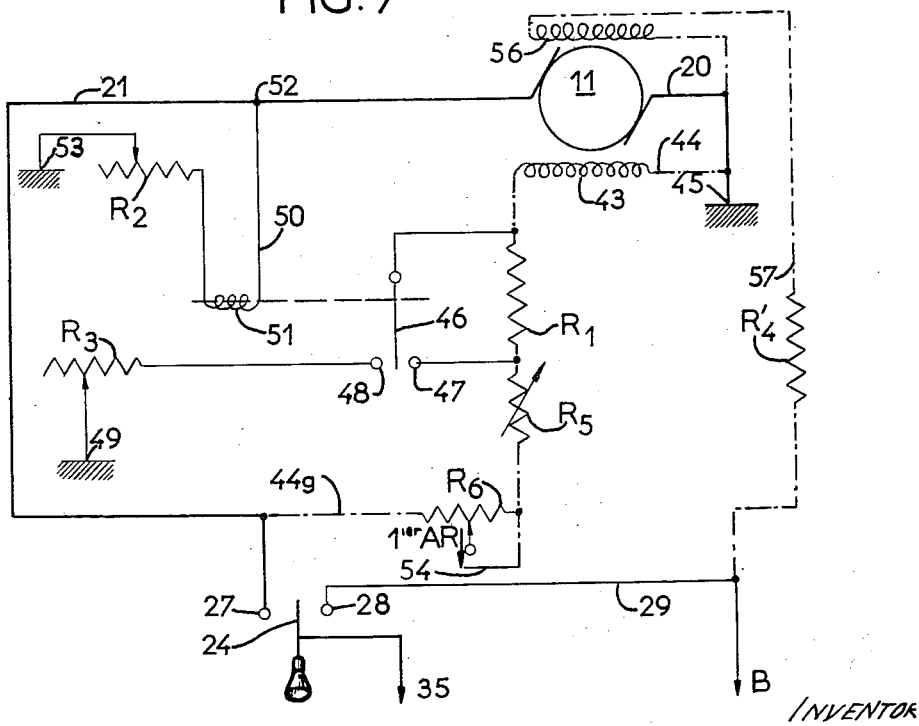
FIG. 7 is another view similar to a part of the wiring diagram of FIG. 1, wherein one of the field windings of the generator is energized shuntwise, while another field winding is energized by the battery.

An auxiliary field is associated with said winding 43 of a pure shunt type and this field may be constituted either by a permanent magnet 55, as in the case of FIG. 6, or by a further winding 56 fed by a lead 57 incorporating a resistance R'4 and starting from the battery B, as illustrated in FIG. 7. Said resistance R'4 may be left permanently in circuit or inserted only for first forward speed or reverse and cut out for second and higher speeds.

Figure 8:
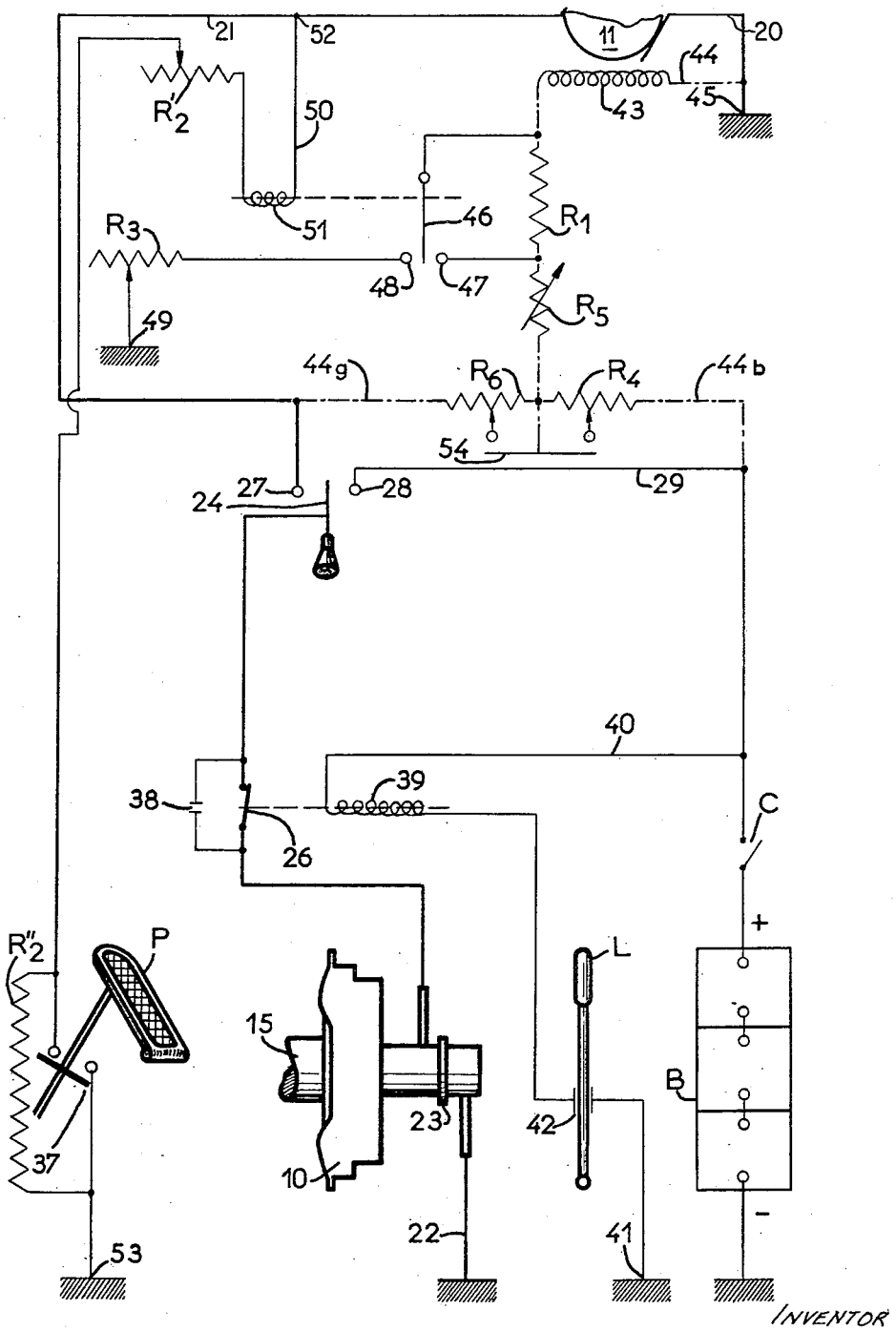
FIG. 8 is a still further modification of FIG. 1, wherein a switch controlled by the raising of the driver's foot, instead of inserting a limited feed through the battery, ensures a lowering of the regulated voltage of the generator.

Turning now to FIG. 8 showing a circuit similar to that of FIG. 1 and including a single field winding 43 fed simultaneously by the generator shunt arm 44g and by the battery shunt arm 44b with the difference, however, that the switch 37 controlled by the driver's foot modifies the adjustment of the means regulating the regulator voltage, instead of controlling merely the shifting of the feed of the clutch 10 from the generator 11 to the battery B through a resistance R and reversely.

In the example illustrated in FIG. 8, the reverse relay 25—30 has been eliminated. The switch 37 is inserted in parallel with a resistance R"2 in the lead 50 including the winding 51 and the resistance R'2 corresponding to the resistance R2 of FIG. 1, 6 or 7. The lead 50 is connected at 52 with the main lead 21.

When the accelerator pedal P is depressed, the switch 37 is open. The sum of said resistances R'2 and R"2 defines the speed of rotation of the engine beyond which the voltage of the generator 11 is regulated, and it defines also the regulated value of said voltage. Said sum R'2+R"2 is equal to the resistance R2 of FIG. 1, so that a similar operation is obtained.

When the accelerator pedal P is completely released, the switch 37 is closed. The resistance R"2 is cut out and only the resistance R'2, which is lower than R2, defines the regulating conditions for the generator voltage; said voltage is consequently adjusted to a lower value which is advantageously such that it corresponds to a torque adapted to be transmitted by the clutch, which is slightly larger than the braking torque produced by the engine and approximates one third of the maximum driving torque. Consequently, when the accelerator is released, the clutch acts as a torque-limiting device, which prevents any skidding of the driving wheels of the vehicle, while benefitting however by the braking action of the engine, chiefly upon a lowering of the speed provided by the change speed gear, as in the case of FIG. 1.

Figure 9:
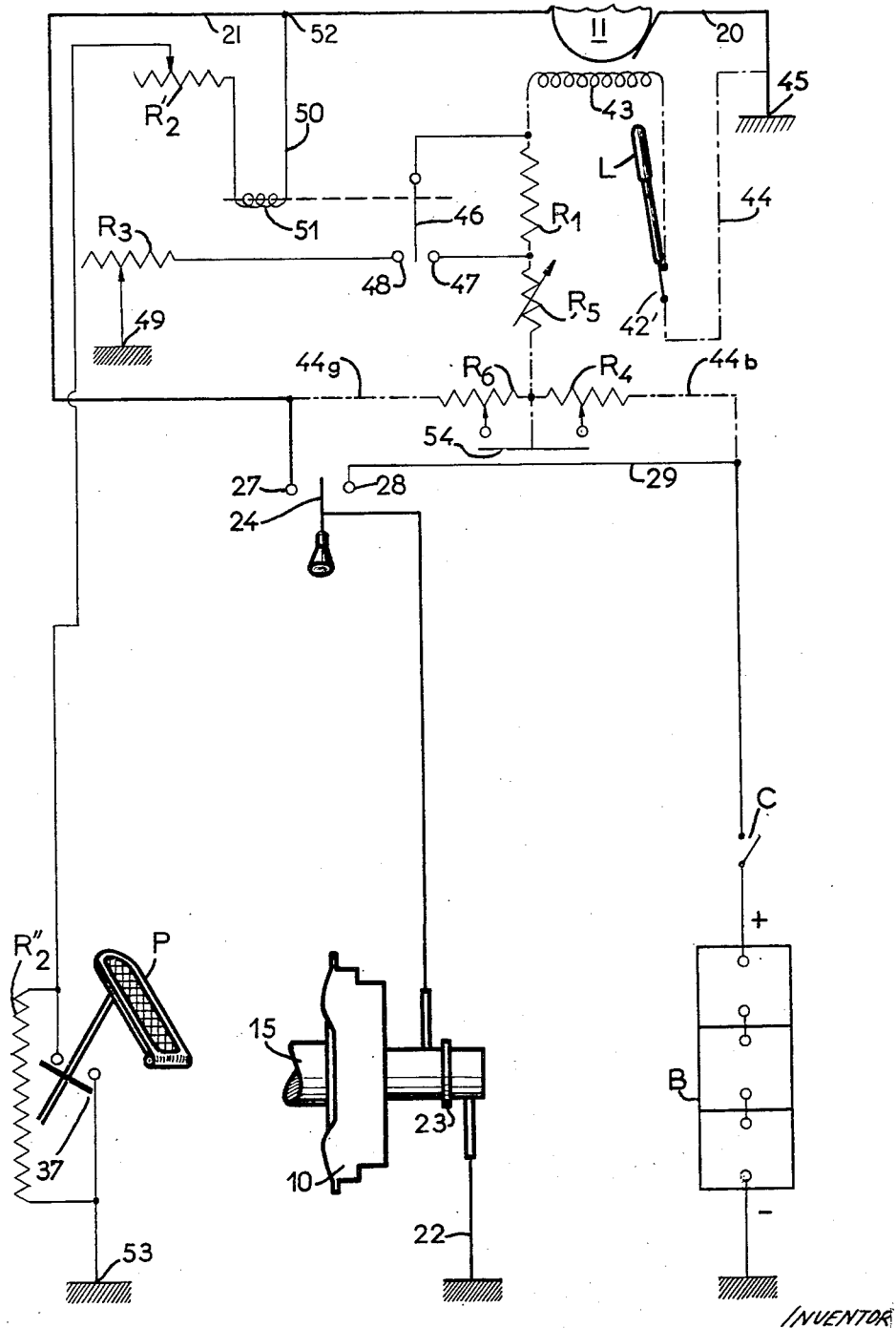
FIG. 9 is a view similar to FIG. 8, wherein a switch connected with the change speed lever, instead of acting on the feed circuit of the clutch, acts on the circuit feeding the field windings of the generator.

Turning now to FIG. 9, the arrangement is similar to that of FIG. 8, with a resistance R"2 inserted in the lead 50 under the control of the switch 37 operated by the driver's foot, but wherein, however, the disconnection accompanying the changes in speed is obtained by breaking the field circuit 44, instead of the main circuit 21. The relay 26 has been eliminated and the switch 42' operated by the lever L is directly inserted in the field circuit 44.

As a matter of fact, the weak current in the circuit 44 allows elimination of the use of a relay, without this leading to any drawback. The switch 42' has, however, its connection reversed with reference to that of the switch 42 of the prior figures: it opens during the speed-changing operations and remains closed otherwise.

Figure 10:
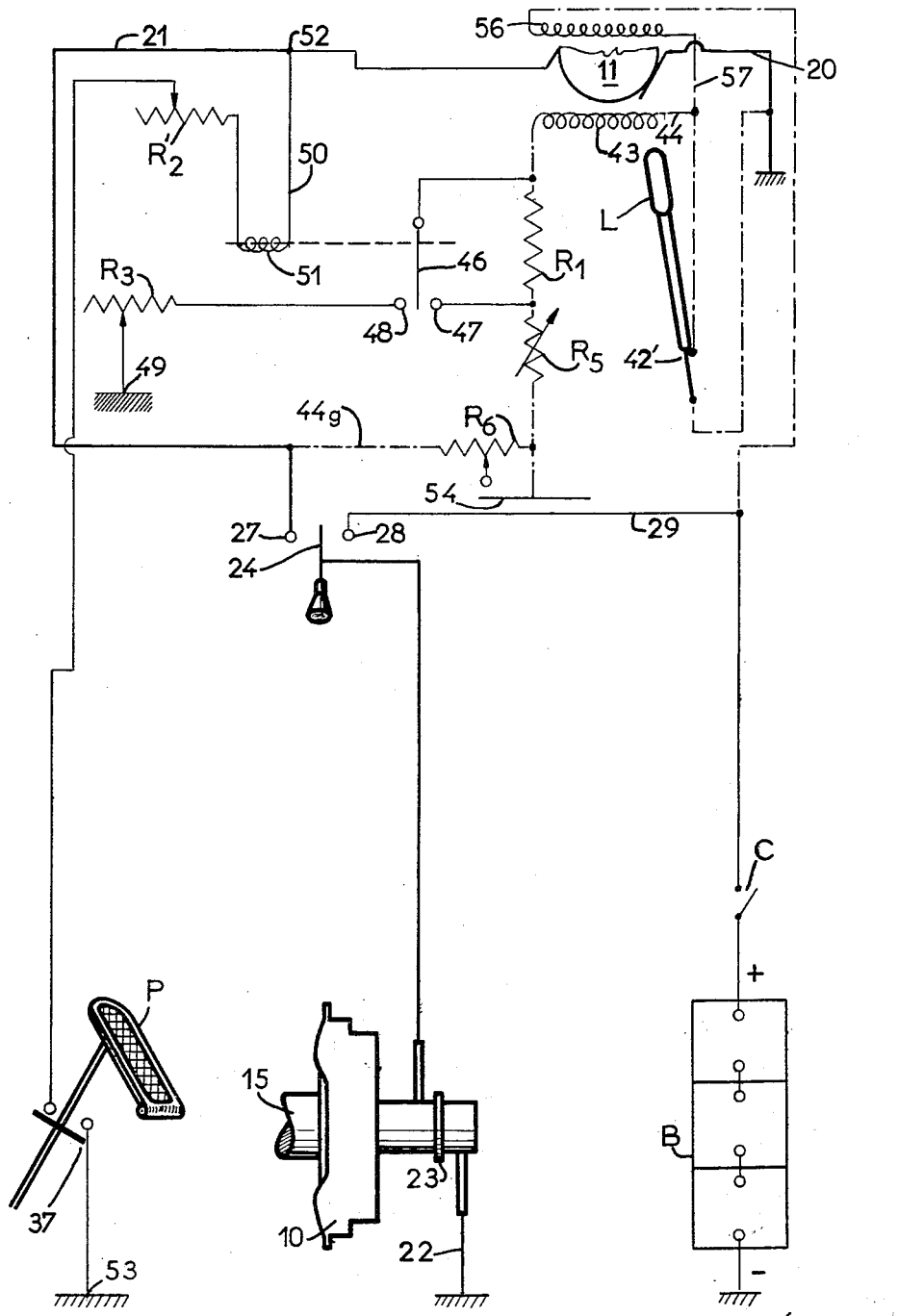
FIG. 10 is a view similar to FIG. 9, provided, however, with two field circuits which latter are controlled by a switch connected with the change speed lever.

When the generator 11 is provided with two field windings such as a shunt energizing field winding 43 and a further field winding 56 fed by the battery, as in the case of FIG. 6, the arrangement of the switch 42' operated by the lever L of the type illustrated in FIG. 9 is possible, as shown in FIG. 10, wherein the switch 42' opens simultaneously the circuits 44 and 57 of the two field windings 43 and 56 respectively during each speed-changing operation.

Of course, my invention is by no means limited to the embodiments described and illustrated and it covers all the modifications of its different parts and applications which do not widen the scope of said invention as defined in the accompanying claims. For instance, the arrangement according to my invention may be used not only for automobiles and the like vehicles, but also for any other suitable application.

What I claim is:

1. A power transmission system for an automotive vehicle comprising an engine, a battery, a dynamo for charging the battery, an accelerator pedal for controlling said engine speed, a gear transmission having low gear ratios and high gear ratios, lever means for changing the gear transmission ratios, an electromagnetic clutch between the engine and the gear transmission, a winding for energizing the clutch, a generator distinct from said dynamo, means for driving said generator at a speed proportional to said engine speed, said generator having an armature circuit and a field circuit, means for connecting said armature circuit with said clutch winding, means for de-energizing said clutch winding upon actuation of said lever means for changing the gear transmission ratios, means for energizing said field circuit from said armature circuit, a first resistor in said field circuit, first means for shunting said first resistor, a first switch in said first shunting means, first control means sensitive to aid armature circuit voltage for actuating said first switch when said voltage reaches a predetermined value, a second resistor in said field circuit, second means for shunting said second resistor, a second switch in said second shunting means, and second control means controlled by said gear transmission for actuating said second switch when the gear transmission ratio passes from a low ratio to a high ratio.

2. A power system as defined in claim 1 further comprising means for feeding said field circuit from said battery, a third resistor in said last mentioned means, third means for shunting said third resistor, and third control means controlled by said gear transmission for actuating said third switch when the gear transmission ratio passes from a low ratio to a high ratio.

3. A power system as defined in claim 1 wherein said generator furthermore comprises a permanent magnet cooperating with said armature.

4. A power system as defined in claim 1 further comprising a second field circuit fed by said battery, a third resistor in said second field circuit, third means for shunting said third resistor, and third control means controlled by said gear transmission for actuating said third switch when the gear transmission ratio passes from a low ratio to a high ratio.

References Cited in the file of this patent

UNITED STATES PATENTS

| 1,946,200 | Easter | Feb. 6, 1934 |
| 2,974,769 | Henderson | Mar. 14, 1961 |
| 2,990,927 | Steadman | July 4, 1961 |

FOREIGN PATENTS

| 1,096,319 | France | Jan. 26, 1955 |